3,776,879
HIGH SOLIDS METHYLATED UREA-FORMALDEHYDE COATING COMPOSITIONS

Werner Josef Blank, Wilton, Conn., assignor to American Cyanamid Company, Stamford, Conn.
No Drawing. Filed Jan. 31, 1972, Ser. No. 222,321
Int. Cl. C08c *11/28, 11/32;* C08f *45/28*
U.S. Cl. 260—33.4 R                    10 Claims

ABSTRACT OF THE DISCLOSURE

There are provided high solids methylated urea-formaldehyde resin compositions comprising (1) at least 80%, by weight, of a blend of (a) liquid or syrupy methylated urea-formaldehyde resins composed of urea, formaldehyde, and methanol in 1:2–3:1–2.5 molar ratio, respectively, and (b) a monofunctional branched-chain aliphatic alcohol wherein the alcohol is present in an amount equal to from 30% to 70% of the overall blend and (2) the balance, that is, not more than, 20%, by weight, if desired, being a suitable solvent for said blend. The composition, when applied as a coating to a metal or wood substrate and heated, will render the surface substantially free from pinholes, crawling, and cratering.

---

The present invention relates to a novel coating composition comprising high solids content of methylated urea-formaldehyde resins. More particularly, it relates to high solids coating compositions comprising a blend of a monofunctional branched-chain aliphatic alcohol and a methylated urea-formaldehyde resin. Still more particularly, it relates to a coating composition comprising at least 80% and as much as 100% of a blend of (1) from 70% to 30% of syrupy methylated urea-formaldehyde resin composed of urea, formaldehyde, and methanol in a 1:2–3:1–2.5 molar ratio, respectively, and (2) from 30% to 70% of a monofunctional branched-chain aliphatic alcohol and to coated substrates free from imperfections, such as pinholes, crawling, and cratering, the percentages recited being by weight.

It is known that urea-formaldehyde resin or other resinous compositions can be employed to coat wood or metallic substrates. Unfortunately, such compositions are prepared as low solids solutions containing not more than about 70% solids because higher solids content would be too viscous for more applications. This is apparently due to the nature of the resinous material present in the composition. Moreover, where high solids coating compositions containing from 80% to 100% of a known resin, such as methylated urea-formaldehyde resin, in the presence of cross-linkable straight-chain monofunctional alcohols were formulated, the coatings were less than satisfactory due to sensitivity of the coating compositions to film imperfections, such as crawling and cratering. Resultant coatings were further found to possess poor chemical and physical properties exhibiting either hard and brittle film characteristics or sticky, soft, and rubbery coatings. If a coating composition can be provided which is devoid of the shortcomings of the prior practice, such would fulfill a long-felt need in the art.

It has been unexpectedly found that a high solids content coating composition can be readily heat-cured by providing a methylated urea-formaldehyde resin in the presence of a branched-chain monofunctional aliphatic alcohol and from 0% to not more than 20% of a suitable solvent for said resin. The alcohol appears to be cross-linked by the urea resin in situ. The latter is a cross-linking agent so that when the resin and alcohol mixture is applied to a substrate, it will result in a coating free from imperfections. It has been further found that the ratio of urea resin to branched-chain monofunctional aliphatic alcohol as hereinbelow defined is critical to achieve the desired coating.

According to the present invention, a blend of (1) methylated urea-formaldehyde resin composed of urea, formaldehyde, and methanol in a 1:2–3:1–2.5 molar ratio present in from 70% to 30%, by weight, and (2) a branched-chain monofunctional aliphatic alcohol present in from 30% to 70%, by weight, either in the presence or absence of a small, but effective, amount of, for instance, 0.1% to 5% of an acidic polymerization catalyst. When the composition is applied to a substrate, the coating composition polymerizes to a smooth, pinhole-free, crater-free, crawling-free topping or coating.

The methylated urea-formaldehyde resins are composed of urea, formaldehyde, and methanol in a 1:2–3:1–2.5 molar ratio, respectively. In one method, the resin can be prepared by refluxing in the anhydrous state a urea, formaldehyde, and methanol at a pH of at least 8 to effect urea-formaldehyde reaction, continuing the reaction at a pH equal to 4.5 to 5.5, and then lowering the pH to from 2 to 3 for about one hour until a syrupy, low polymeric material has been obtained.

Exemplary of the branched-chain primary or secondary alcohols which contain from at least 6 and preferably from 8 to 18 carbon atoms, or more, are: 2-ethyl hexanol, iso-octanol, diisobutyl carbinol, iso-decanol, 2,6,8-trimethyl-4-nonanol, and isooctadecanol. Also contemplated are dihydric alcohols which are monofunctional. Such typical dihydric alcohols are: 2-methyl-2,4-pentanediol, 2-ethyl-2,4-pentanediol, and 2-ethyl-2,4-hexanediol. The latter dihydric alcohols contain a secondary hydroxyl group which is reactive and a tertiary hydroxyl group which is unreactive. If desired, mixtures of monofunctional alcohols can be employed in preparing the blend. The alcohol component of the blend on a weight basis may range from about 30% to about 70%, the remainder being the urea resin defined hereinabove, provided that a mol ratio of 0.4 to 0.8 mol of the alcohol blend per mol of urea resin is maintained.

Advantageously, the blend of the present invention can be prepared in the absence of either an acidic polymerization catalyst or solvent. However, if polymerization or curing temperatures of less than about 175° C. are desired, the utilization of an acidic catalyst is required to effect curing within a short period of time, say between five and twenty minutes. Otherwise, at the lower temperatures, say 125° C., an extended curing or heating period would be necessary to achieve the coating desired. Illustrative catalysts are: phosphoric acid, butylphosphoric acid, sulfuric acid, hydrochloric acid, methane sulfonic acid, toluene sulfonic acid, and equivalents of the same. Similarly, it is preferred to omit a solvent, such as water, toluene, or other organic solvent, for the urea resin in preparing the blended mixture. However, there may be added up to about 20%, by weight, of any suitable solvent based on the overall weight of the blend to lower or otherwise modify the viscosity of the blend. Further, a portion of the polyhydric alcohol may be substituted by a viscosity flow modifier so as to increase the viscosity of the composition. The use of polyesters, polyethers, or acrylic resins in small quantities, generally from 5% to 20% of the overall composition, will insure that the resultant viscosity will render the composition sprayable.

Surprisingly, the monofunctional aliphatic alcohols can be employed to effect cross-linking or curing of a methylated urea-formaldehyde resin so that the latter, when spread over a surface, will render that surface entirely satisfactory both chemically and physically.

For a better understanding of the invention, it will be further illustrated by the following examples which are to

EXAMPLE 1

This example illustrates the preparation of a methylated urea-formaldehyde resin which can be employed as a component of the blend constituting the coating composition of the present invention.

To a two-liter, three-necked flask equipped with stirrer, condenser, and thermometer are charged 288 parts of methanol, 297 parts of 91% paraformaldehyde, and triethanolamine to adjust the pH to 9 to 10. The temperature is raised to 50° C. and 180 parts of urea are added over a period of twenty minutes. The mixture is heated to reflux (81° C.). Refluxing is continued for twenty-five to thirty minutes or until the mixture is clear and homogeneous. The mixture is cooled to 75° C. and to it is added over a seven-minute period (to prevent excessive exotherm) sufficient 90% aqueous formic acid to reduce the pH of the mixture to 4.5 to 5.5. The mixture is then brought to reflux (about 84° C.), and refluxing is continued for about three hours. At the end of this period, the rate of reaction of the methanol with the ureaformaldehyde reaction product has become slow.

The mixture is then allowed to cool to 25° C., and 70% aqueous nitric acid is uniformly added over an additional seven-minute period to adjust the pH downward to 2 to 3. The mixture is then stirred at 25° C. to 30° C. until a urea-formaldehyde-methanol resin is formed. About one hour is generally required. The mixture is then adjusted to pH 7 to 8 with 50% aqueous sodium hydroxide solution and stripped under reduced pressure to remove substantially all of the volatiles present (water, formaldehyde, and methanol). The terminal temperature of the stripping step is about 100° C. Resultant syrup is cooled to room temperature.

The mol ratio of the urea, formaldehyde, and methanol resin as hereinabove prepared analyzes as 1 mol:2.4 mols:1.6 mols, respectively. Although the latter resin is employed in each of the examples below, other resins of differing mol ratios, such as 1:2.4:1.9, can be advantageously employed herein with attendant good results.

EXAMPLES 2 TO 9

A plurality of blends of urea resin as defined above, an alcohol, and, optionally, an acid catalyst is poured over 4-inch by 12-inch stainless steel panels and drained for ten minutes. The films are then baked or cured at 125° C. for ten minutes. The compositions and hardness results are set forth in Table I below.

EXAMPLES 10 TO 14

As in Examples 2 to 9 above, a plurality of blends of urea resin, an alcohol, and acid catalyst is applied to aluminum panels so as to maintain a wet film thickness of one mil on each panel. After a flash-off time of five minutes, the films are cured or baked at 125° C. for fifteen minutes. The compositions, as well as the Knoop hardness, are set forth in Table II below.

TABLE II

| Example | 10 | 11 | 12 | 13 | 14 |
|---|---|---|---|---|---|
| Composition: | | | | | |
| Urea resin (Example 1) | 50 | 60 | 70 | 80 | 70 |
| 2-methyl-2,4-pentanediol | 50 | 40 | 30 | 20 | 15 |
| Iso-decanol | | | | | 15 |
| p-Toluol sulfonic acid (20% aqueous solution) | 4 | 4 | 4 | 4 | 4 |
| Knoop hardness | Sticky | 0.9-1 | 28 | 3-4 | 27 |

It will be noted that the films prepared in Examples 12 and 14 particularly are very hard and tough and free from any film imperfections, resisting some 100 acetone rubs. Water immersion for as long as 24 hours did not soften the films; nor did it cause any blistering of the coating. It will be further noted that the proportion of the blend is critical in order to attain the desired film coating.

Although 50 parts of urea resin are reacted with 50 parts of 2-methyl-2,4-pentanediol, the mol ratio of alcohol to urea resin is 1.35 to 1. As hereinabove indicated, this ratio is without the purview of the present invention.

I claim:
1. A coating composition comprising:
   (1) at least 80%, by weight, of a blend comprising (a) from 70% to 30%, by weight, of a syrupy methylated urea-formaldehyde resin composed of urea, formaldehyde and methanol in 1:2-3:1-2.5 molar ratio, respectively, and (b) from 30% to 70%, by weight, of a branched-chain aliphatic monofunctional primary or secondary alcohol containing from 6 to 18 carbon atoms, the molar ratio of said 6 to 18 carbon atom alcohol to said urea resin being 0.4–0.8:1, respectively, and
   (2) from 0% to 20%, by weight, of an inert aqueous or organic solvent for said blend.
2. The composition according to claim 1 wherein the

TABLE I

| Example | 2 | 3 | 4 | 5 | 6 | 7 | 8 | 9 |
|---|---|---|---|---|---|---|---|---|
| Composition: | | | | | | | | |
| Urea resin (example 1) | 20 | 30 | 40 | 60 | 70 | 80 | 60 | 50 |
| Iso-decanol | 80 | 70 | 60 | 40 | 30 | 20 | 40 | |
| Iso-octanol | | | | | | | | 50 |
| p-Toluol sulfonic acid (20% aqueous solution) | 3 | 3 | 3 | 3 | 3 | 3 | 3 | 3 |
| Ethanol | | | | | | | 10 | |
| Knoop hardness [1] | Sticky | 0.5-6. | 0.8-1.2 | 18-20 | 8-10 | Soft | 3-4 | 2 |

[1] Tukon hardness.

It will be noted that, with the exception of Examples 3 to 6, 8, and 9, the films were soft and sticky without any mechanical or physical properties. However, in Examples 5, 8, and 9, the films were hard, tough, and mar resistant. On observation, they were additionally smooth to the touch, free from any craters and pinholes, and did not exhibit any crawling. The films in the latter examples resisted acetone and other solvent rubbing.

Similar films are obtained when 2,6,8-trimethyl-4-nonanol is employed in lieu of iso-decanol. When omitting the acid catalyst in each of the examples, similar films are obtained when baking or curing to a temperature of 175° C. instead of a temperature of 125° C.

urea resin is composed of urea, formaldehyde, and methanol in a molar ratio, of 1:2.4:1.6, respectively.
3. The composition according to claim 1 wherein a small, but effective, amount of an acid polymerization catalyst is present in the blend.
4. The composition according to claim 3 wherein the catalyst is o-toluenesulfonic acid.
5. The composition according to claim 1 wherein no solvent is present and the blend comprises 60%, by weight, of the urea resin and 40%, by weight, of the alcohol.
6. The composition according to claim 1 wherein 10% ethanol solvent is present.

7. The composition according to claim 1 wherein the monofunctional alcohol is iso-decanol.

8. The composition according to claim 1 wherein the monofunctional alcohol is 2-methyl-2,4-pentanediol.

9. The composition according to claim 1 in which the alcohol is a 50—50 mixture of 2-methyl-2,4-pentanediol and iso-decanol.

10. The composition according to claim 1 in which the alcohol is iso-octanol.

References Cited
UNITED STATES PATENTS

| | | | |
|---|---|---|---|
| 2,327,984 | 8/1943 | West | 260—70A X |
| 2,615,003 | 10/1952 | Suen et al. | 260—33.4 |
| 3,247,149 | 4/1966 | Alek | 260—33.4 X |

LEWIS T. JACOBS, Primary Examiner

U.S. Cl. X.R.

260—29.4 R

UNITED STATES PATENT OFFICE
CERTIFICATE OF CORRECTION

Patent No. 3,776,879     Dated December 4, 1973

Inventor(s) WERNER JOSEF BLANK

It is certified that error appears in the above-identified patent and that said Letters Patent are hereby corrected as shown below:

Column 3, in Table I: In the top line, after "Example", change "6" (second occurence) to -- 9 --; in the bottom line, after "Knoop hardness' change "0.5-6." to -- 0.5-0.6 --. Column 3 line 63. Delete ""3 to" and replace by -- 5, --. Column 4, in Table II: In the seventh line, change "solution" to -- solution) --.

Signed and sealed this 7th day of May 1974.

(SEAL)
Attest:

EDWARD M.FLETCHER,JR.        C. MARSHALL DANN
Attesting Officer            Commissioner of Patents